United States Patent
Kunioka et al.

[11] 3,773,260
[45] Nov. 20, 1973

[54] METHOD OF ADJUSTING THE COOLING SPEED OF WELDS

[75] Inventors: Kazuo Kunioka; Junichi Tanaka; Takao Noguchi; Tsutomu Ikoma; Toyofumi Kitada; Jinkichi Tanaka, all of Yokohama, Japan

[73] Assignee: Nippon Kokan Kabushiki Kaisha, Tokyo, Japan

[22] Filed: Dec. 8, 1972

[21] Appl. No.: 313,409

[30] Foreign Application Priority Data
Dec. 20, 1971 Japan.............................. 46/103408

[52] U.S. Cl...................... 239/10, 239/434, 228/46, 29/487, 219/73
[51] Int. Cl....... B05b 7/00, B23k 9/18, B23k 25/00
[58] Field of Search...................................... 228/46; 239/8–10, 422, 398, 434; 29/487; 219/73

[56] References Cited
UNITED STATES PATENTS
| | | | |
|---|---|---|---|
| 2,107,435 | 2/1938 | Birmingham | 228/46 X |
| 3,137,446 | 6/1964 | Masuda | 239/434 |
| 3,660,629 | 5/1972 | Nakai et al. | 219/73 |

Primary Examiner—Robert S. Ward, Jr.
Attorney—Robert D. Flynn et al.

[57] ABSTRACT

A weld zone formed by continuous electric welding is cooled by applying a mist jet of cooling water and the cooling speed is adjusted by adjusting the weight ratio of the cooling water to pressurized air utilized to form the mist and by adjusting the velocity of the mist jet.

2 Claims, 4 Drawing Figures

METHOD OF ADJUSTING THE COOLING SPEED OF WELDS

BACKGROUND OF THE INVENTION

This invention relates to a method of adjusting the cooling speed of a weld zone formed by continuous electric welding and regions adjacent to the weld by applying a mist jet of cooling water upon the weld zone immediately after welding.

When the weld zone formed by continuous electric welding such as electrogas welding, electroslag welding and submerged arc welding are cooled by natural or forced air cooling, the cooling speed of the weld zone, particularly the bond, is low with the result that the mechanical properties of these portions are deteriorated. This tendency is more significant where the input heat quantity is increased for the purpose of improving the efficiency. For this reason, in certain applications, the weld zone is cooled by water immediately after the welding operation for the purpose of increasing the cooling speed. Although, with the water cooling it is possible to increase the cooling speed, it is difficult to adjust the same. Especially, as the cooling speed is too fast for this sheets, quenching cracks are formed during the cooling, or degradation of the impact characteristic caused by martensite structure is often noted. For this reason, where the weld zone is cooled by water, it has been necessary to heat-treat the sheets after welding.

SUMMARY OF THE INVENTION

The object of this invention is to provide an improved method of cooling the weld zone, which can obviate the disadvantages of the above described method of air cooling and water cooling.

A further object of this invention is to increase the cooling speed of a weld zone formed by continuous electric welding thereby increasing the welding efficiency.

Another object of this invention is to select a desired cooling speed which is most suitable for the welded material.

According to this invention, there is provided a method of adjusting the cooling speed of weld zone formed by continuous electric welding characterized in that a mist jet of cooling water is applied to the weld zone and the weight ratio of the water to pressurized air utilized to form the mist and the velocity of the mist are adjusted to adjust the cooling speed.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 1:
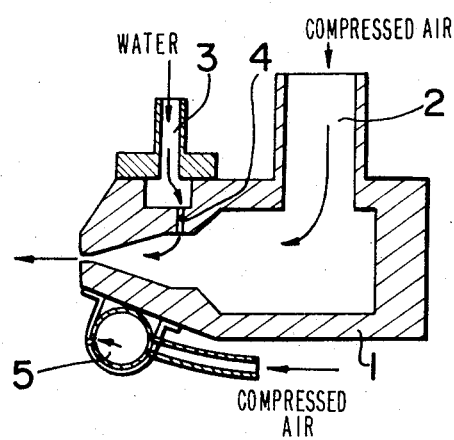
FIG. 1 shows a diagrammatic sectional view of a mist jet nozzle used to carry out the method of this invention.

With reference now to the accompanying drawing, the nozzle of a mist jet cooling device shown in FIG. 1 is disclosed in the specification of Japanese patent application No. 95896 of 1969 and comprises a hollow body 1 provided with an air inlet pipe 2 through which compressed air is admitted in the body 1, and a water inlet pipe 3. The water supplied through a water inlet pipe 3 is passed through a narrow opening 4 provided near the orifice of the nozzle and the water passed through the narrow opening is atomized by the compressed air thereby ejecting a mixture of air and mist through the orifice. In applying the device to the present invention, a front nozzle (5) is additionally provided so as to prevent the mist from the cooling nozzle from reaching the portion of the work where welds are being deposited.

Figure 2:
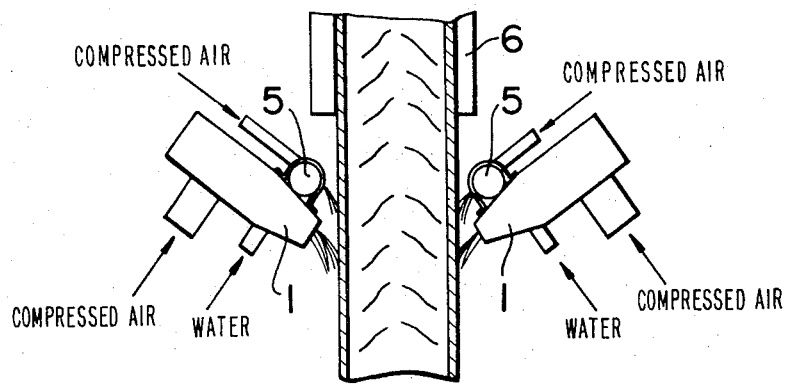
FIG. 2 is a diagrammatic side view showing the relationship between a plurality of mist jet nozzles and a welded article to be cooled.

FIG. 2 shows an arrangement for cooling a weld zone with two mist jet cooling devices shown in FIG. 1 wherein the mist jet cooling devices form acute angles with the welding zone and it is so arranged that the direction in which said angles are opened corresponds to the direction in which welding proceeds. With this arrangement, it is possible to adjust the cooling speed of the weld zone to any desired value thereby cooling the weld zone at any desired speed by varying the weight ratio of the water to the air ejected from the nozzle, the distance between the weld and the nozzle or the air pressure (consequently the jet speed). The opposite portions of the work where welds are being deposited are cooled by means of a copper shoe 6. As an example, in the case of a weld formed on a steel plate having a thickness of 40 mm and formed by an electrogas welding at a speed of 42 mm/min. and an input heat of 195 KJ/cm, when the weld was cooled by only th copper shoe, the cooling speed from 800°C to 500°C at the center of the thickness was 2.2°C/sec. but was increased to 13°C/sec. when the conventional water cooling was added.

According to the method of this invention utilizing the mist jet, a cooling speed of 17°C/sec. was obtained where an air pressure in the front nozzle of 1.0 Kg/cm$^2$, an air pressure in the mist nozzle of 0.5 Kg/cm$^2$. and a weight ratio of water to air of 4.5 were used. The cooling speed was increased to 8°C/sec. when said ratio was 2.0.

Figure 3:
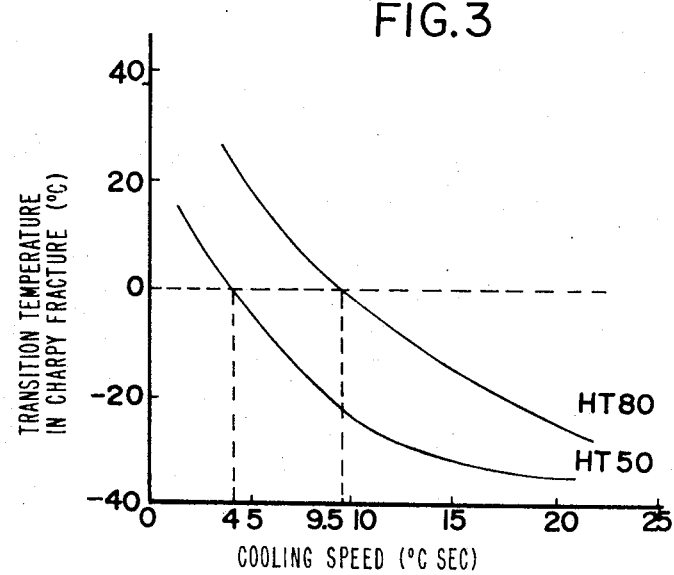
FIG. 3 is a graph to show the relationship between cooling speed and the transition temperature in Charpy fracture of the bond.

FIG. 3 shows the relationship between the cooling speed in °C/sec. and the transition temperature in Charpy fracture of the bond. From FIG. 3, it can be noted that in order to make the Charpy transition temperature of HT50. (high tensile steel having a tensile strength of 50 Kg/mm$^2$) and HT80 (high tensile steel having a tensile strength of 80 Kg/mm$^2$) to be lower than 0°C, it is necessary to select cooling speeds higher than 4°C/sec and 9.5°C/sec respectively.

In the case of submerged arc welding it is necessary to prevent the mist from contacting the powder of flux by providing a suitable shield. When the weld formed by the submerged arc welding was cooled naturally without removing the flux, the cooling speed at the center (in the direction of thickness) of a weld formed on a steel plate having a thickness of 40 mm by an input heat of 100 KJ/cm was 5°C/sec. In one example of this invention, when a mist nozzle was positioned 120 mm spaced from the upper surface of a steel plate to apply the mist at an air pressure of 0.5 Kg/cm² and a weight ratio of water to air of 4.5, the cooling speed at the center of the thickness was 15°C/sec. When the weight ratio of water to air was decreased to 2.5, a cooling speed of 8°C/sec. was obtained.

Figure 4:
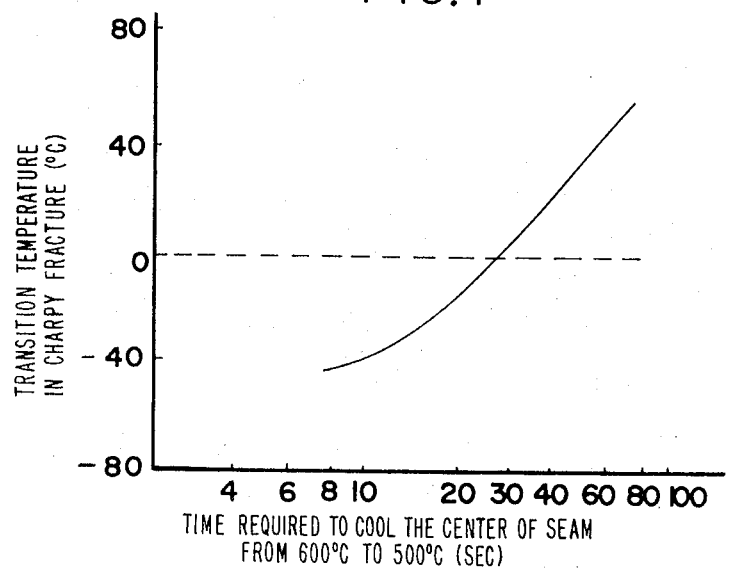
FIG. 4 is a graph showing the relationship between the cooling time from 800°C to 500°C and the transition temperature in Charpy fracture of the bond formed by submerged arc welding and cooled by mist jets.

FIG. 4 is a graph showing the relationship between the transition temperature in Charpy fracture in °C at the bond and the time in seconds required to cool the center of the joint of a 80 Kg/mm² high tensile steel plate having a thickness of 40 mm from 800°C to 500°C. As can be noted from FIG. 4, in order to limit the transition temperature in Charpy fracture to be less than 0°C, it is necessary to limit the cooling time to be less than 30 seconds or to use a cooling speed higher than 10°C/sec.

Since the weld and the portions of the mother metal adjacent to the weld are heated to nearly the same temperature, these portions are subjected to a heat hysteresis different from the mother metal thereby greatly affecting the mechanical properties of the welded article. According to this invention as it is possible to cool at a suitable accelerated speed, substantially the same mechanical properties are maintained for the mother metal before and after welding. Moreover, as the weld zone is efficiently cooled, it is possible to improve the mechanical properties thereof. Even when the input heat of the welding is increased, it is possible to use an increased cooling speed suitable for the increased input heat thereby improving the efficiency of the welding operation. Further it is possible to avoid the formation of crackings which arise in the case of conventional water cooling.

What is claimed is:

1. A method of adjusting the cooling speed of a weld zone formed by continuous electric welding comprising the steps of applying a mist jet of cooling water to said weld zone, and adjusting the weight ratio of said water to pressurized air utilized to form said mist and the velocity of said mist jet.

2. The method according to claim 1 wherein said mist jet is prevented from reaching the portions of the work where welds are being deposited by ejecting air ahead of said mist jet.

* * * * *